Figure 1:
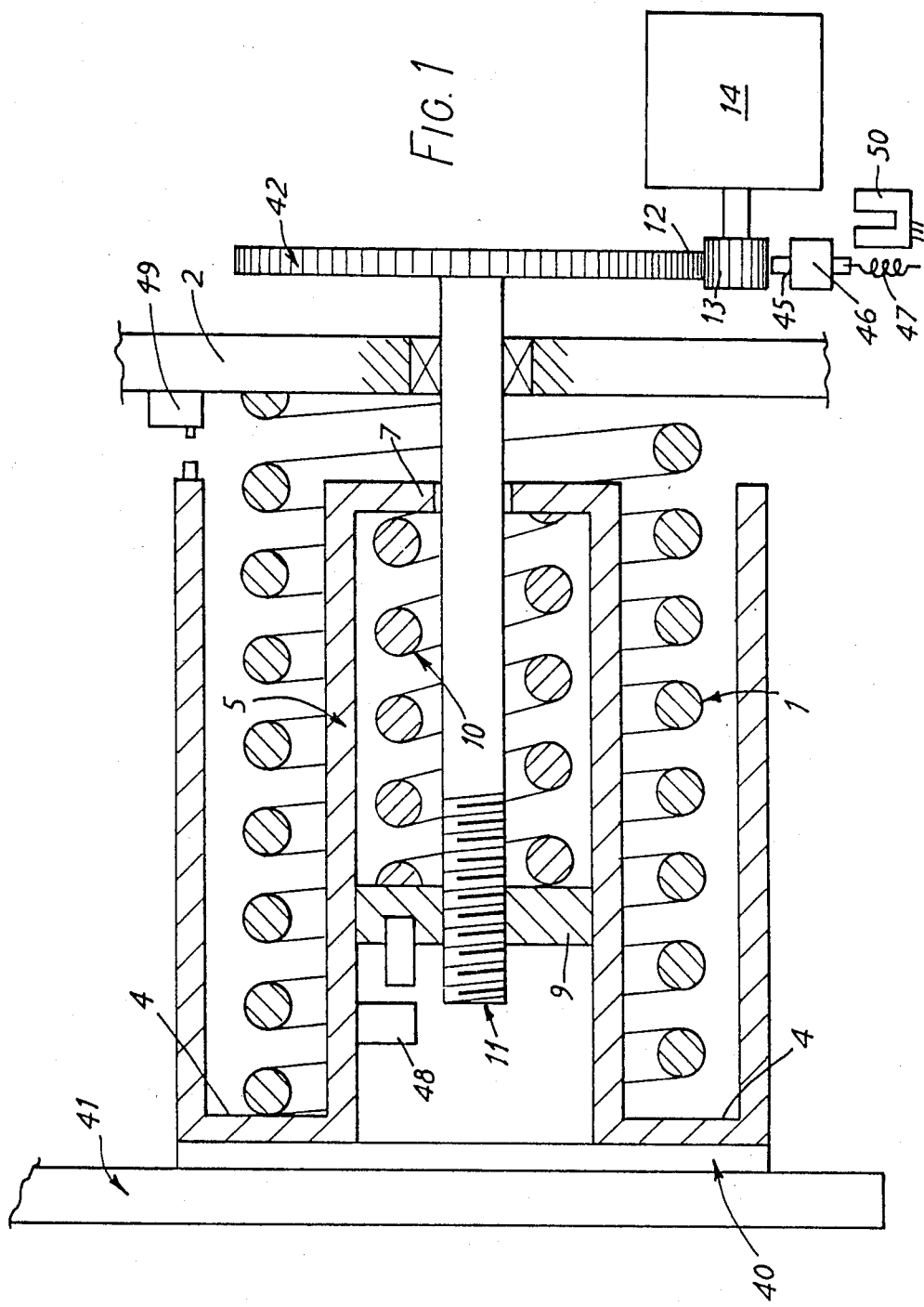

United States Patent [19]

Wickham et al.

[11] Patent Number: 4,546,295

[45] Date of Patent: Oct. 8, 1985

[54] ELECTRIC ACTUATORS

[75] Inventors: David J. Wickham; Jack Washbourn, both of Chippenham; Howard F. Cogan, Leire, all of England

[73] Assignee: Westinghouse Brake & Signal, Wiltshire, England

[21] Appl. No.: 607,631

[22] Filed: May 7, 1984

[30] Foreign Application Priority Data

May 12, 1983 [GB] United Kingdom ............... 8313102
Jun. 23, 1983 [GB] United Kingdom ............... 8317063
Jun. 23, 1983 [GB] United Kingdom ............... 8317064
Oct. 4, 1983 [GB] United Kingdom ............... 8326467

[51] Int. Cl.$^4$ .......................... H02K 7/06; H02K 7/10
[52] U.S. Cl. .................................. 318/372; 318/254; 318/466; 318/362; 318/371; 318/273; 318/269; 310/80; 310/83; 188/162
[58] Field of Search ............... 318/371, 372, 362, 301, 318/261, 269, 273, 614; 310/77, 80, 83; 180/170; 188/162, 158, 74, 33; 246/182 R; 192/1, 116.5, 147, 140; 267/168

[56] References Cited

U.S. PATENT DOCUMENTS

| | | | |
|---|---|---|---|
| 874,219 | 12/1907 | Mahoney | 188/162 X |
| 2,418,351 | 4/1947 | Jackson | 318/261 X |
| 2,446,393 | 8/1948 | Russell | 310/83 |
| 2,479,019 | 8/1949 | Ochtman | 310/83 |
| 2,480,212 | 8/1949 | Baines | 310/83 |
| 2,756,014 | 7/1956 | Leibfried | 267/170 X |
| 3,038,352 | 6/1962 | Murphy | 310/83 X |
| 3,159,758 | 12/1964 | Hemperly et al. | 310/83 |
| 3,399,879 | 9/1968 | Takeshi Hojo et al. | 267/178 |
| 3,659,683 | 5/1972 | Betzing | 188/162 |
| 4,136,304 | 1/1979 | Baechler et al. | 318/372 |
| 4,364,111 | 12/1982 | Jocz | 318/466 X |
| 4,445,075 | 4/1984 | Fry | 318/434 |
| 4,463,291 | 7/1984 | Usry | 318/254 |

Primary Examiner—William M. Shoop, Jr.
Assistant Examiner—Shik Luen Paul Ip
Attorney, Agent, or Firm—Larson and Taylor

[57] ABSTRACT

The present invention provides an electric actuator having an output member movable from a first variable position to a second variable position; an electric motor operable to control a spring system to exert an output force on the output member when in its second position; a device for generating an electrical signal when the output member is about to leave the second position as it returns to the first position; and a motor-control electrical circuit which recognizes the generation of the electrical signal and thereafter operates the electric motor to a pre-determined degree to move the output member a corresponding pre-determined distance back to the first position so that there is preserved a substantially constant distance between the first and second positions.

8 Claims, 8 Drawing Figures

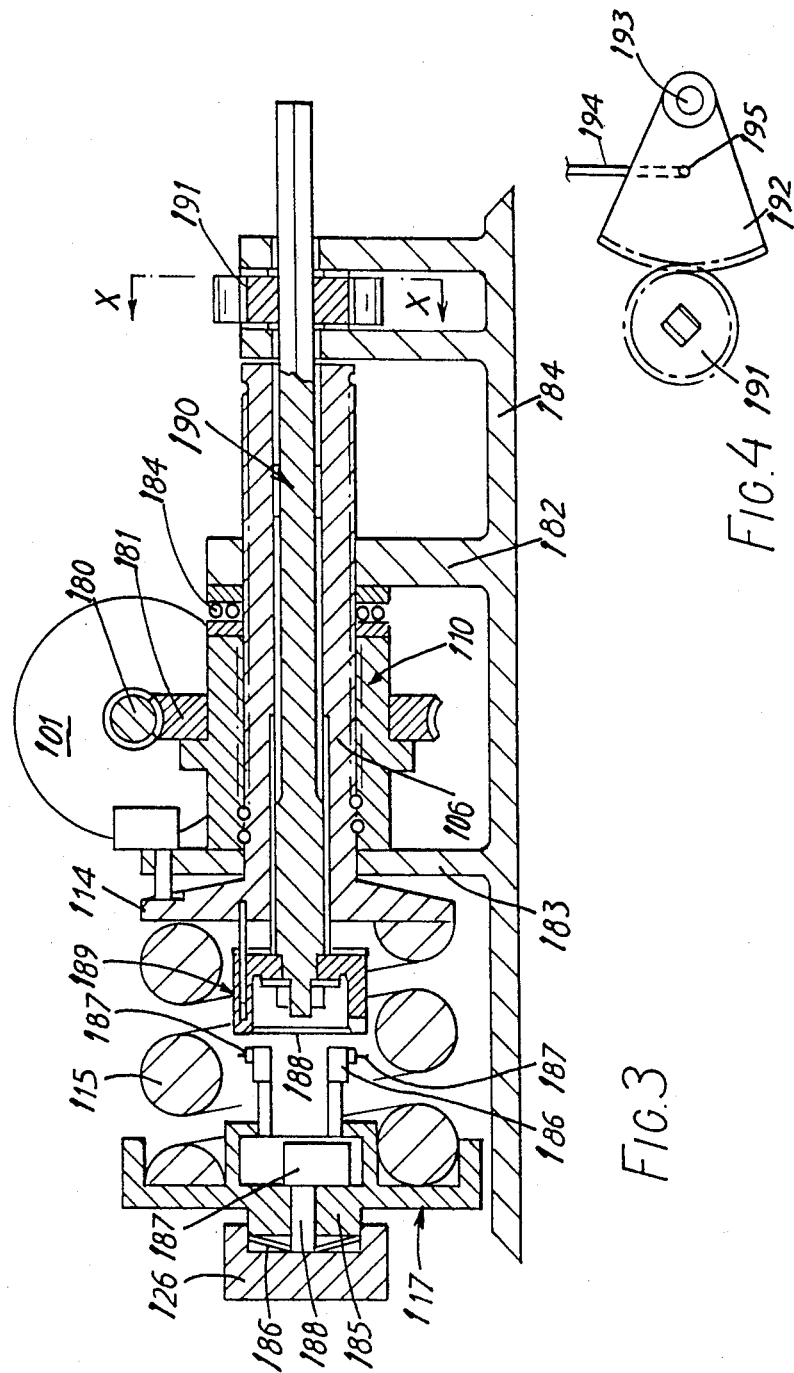

ELECTRIC ACTUATORS

This invention relates to electric actuators and, more particularly, although not exclusively to electric actuators usable as brake actuators for vehicles.

Particularly for brake actuators (whether for vehicles or otherwise) it is frequently desirable that a substantially constant "clearance" be held between the braking members in the "brake released" condition for well known reasons.

The present invention provides a particularly simple way of achieving this desired feature in electric actuators.

Accordingly, the present invention provides an electric actuator having an output member movable from a first variable position to a second variable position; an electric motor operable to control a spring system to exert an output force on the output member when in its second position; means for generating an electrical signal when the output member is about to leave the second position as it returns to the first position; and a motor-control electrical circuit which recognises the generation of the electrical signal and thereafter operates the electric motor to a pre-determined degree to move the output member a corresponding pre-determined distance back to the first position so that there is preserved a substantially constant distance between the first and second positions.

The output member may be in two parts between which are located an element collapsible under the transmission of the output force between the two parts, the means being responsive to recovery of the element upon removal of the output force from the output member to generate the electrical signal.

The spring system may be comprised solely by a power spring, the electric motor then being operable to vary the length of the power spring thus to cause it to exert the output force.

In an alternative, the spring system may be comprised by a force-applying power spring arranged to exert a force on the output member and a force-applying control spring arranged with respect to the power spring such that the force exerted by the control spring is detracted from the force exerted by the power spring to determine the residual force exerted on the output member by the power spring which residual force constitutes the output force, the electric motor being arranged to vary the detractive force exerted by the control spring. In this case, the means may be responsive to recovery of the control spring to a condition in which it exerts its maximum detractive force.

The electric motor may be a rotary motor and be operative to control the spring system by relative rotation of two threadedly-engaged parts, said means measuring the degree of rotation of the electric motor. The means may then be a Hall-effect switch.

The means may be a free-wheel arrangement by which the electric motor is permitted to free-wheel a pre-determined amount after the generation of the electric signal under the influence of spring means tending to move the output member away from the second position.

Figure 2:
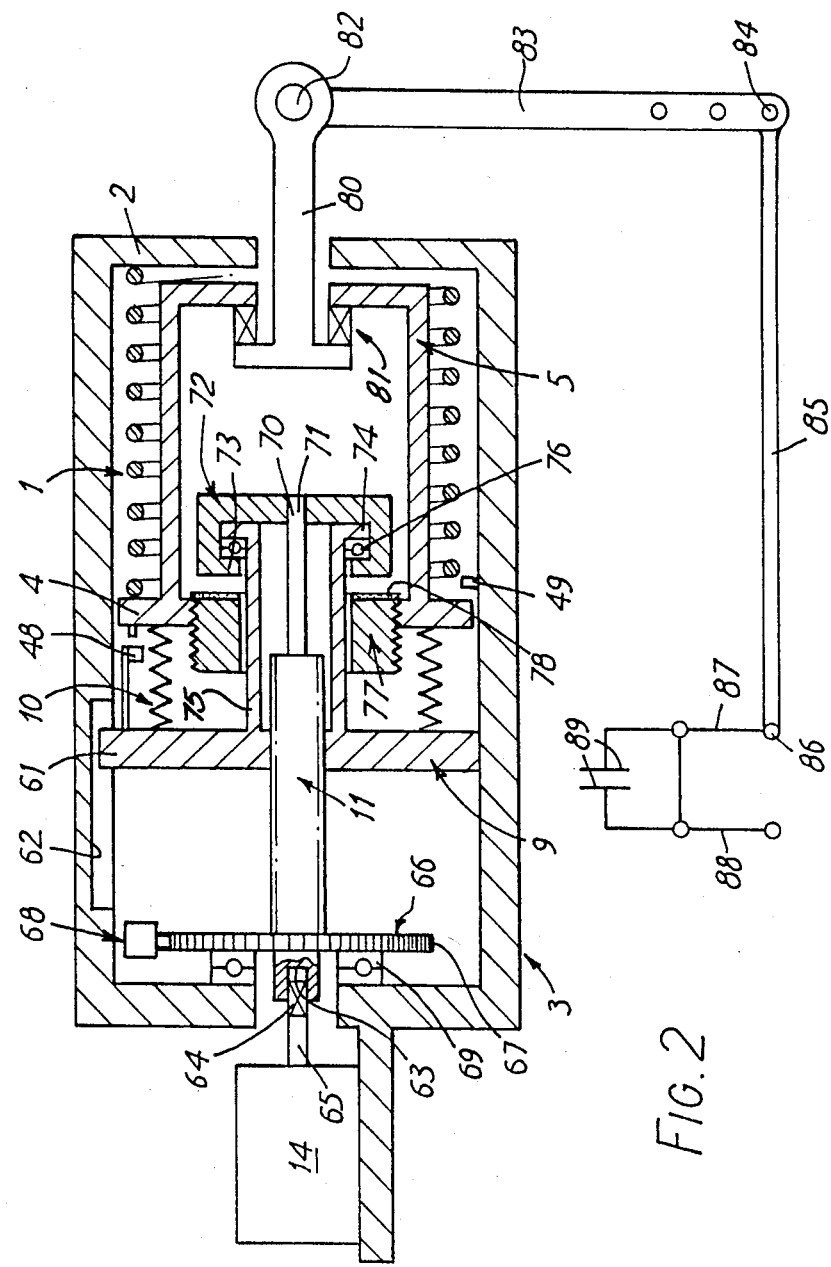
Figure 5:
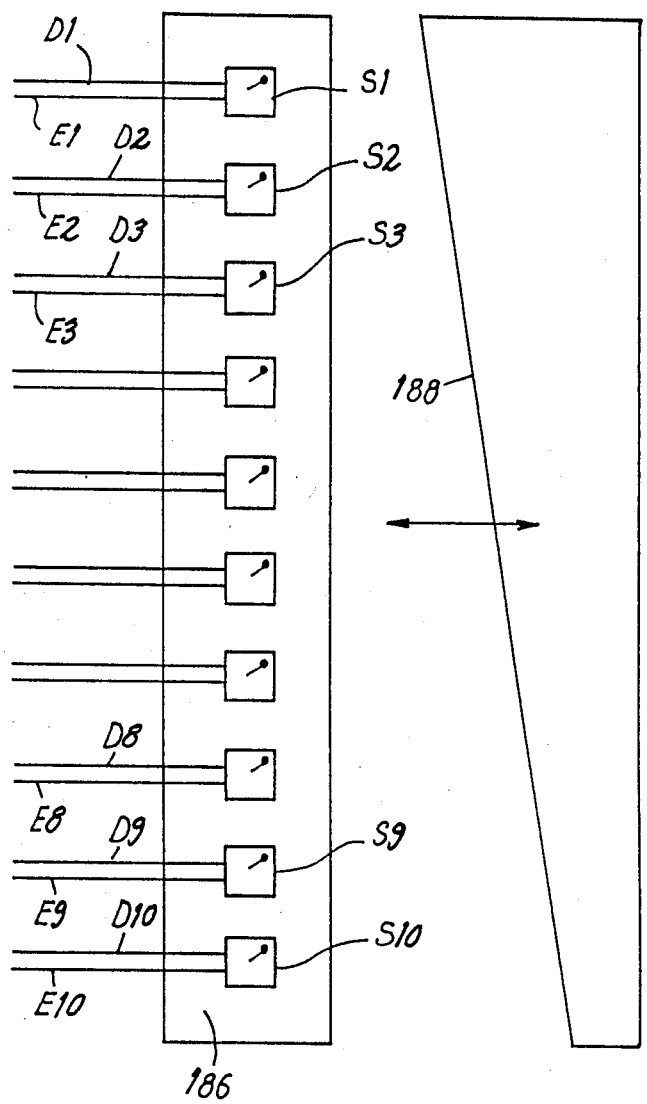
Figure 6:
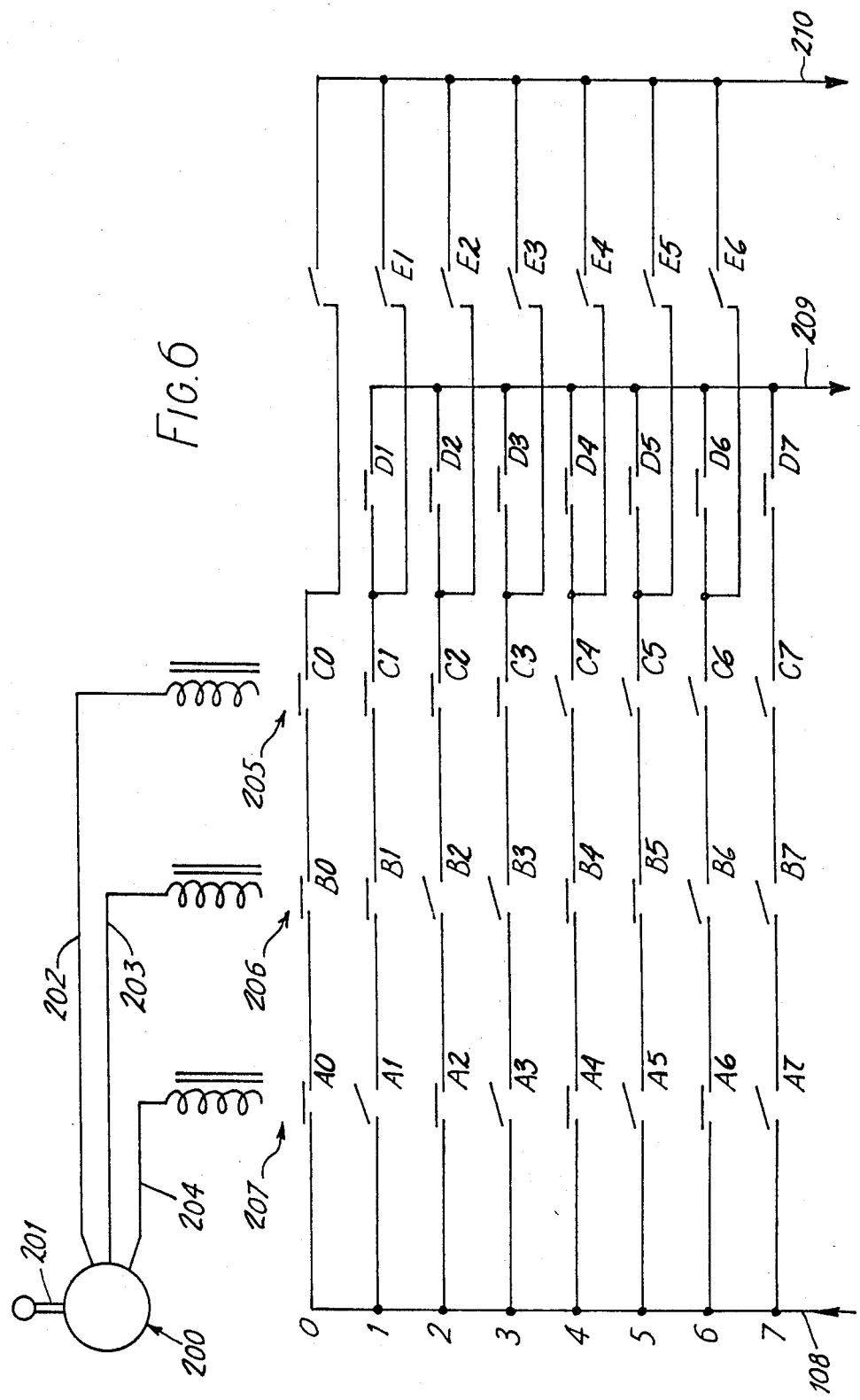
Figure 7:
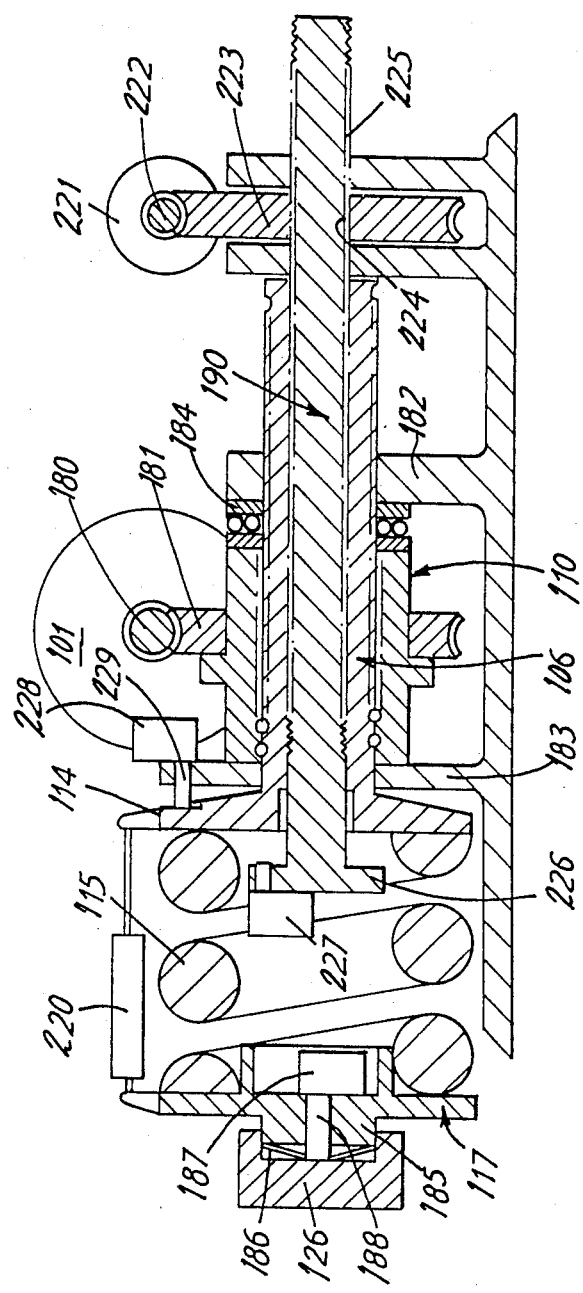
Figure 8:
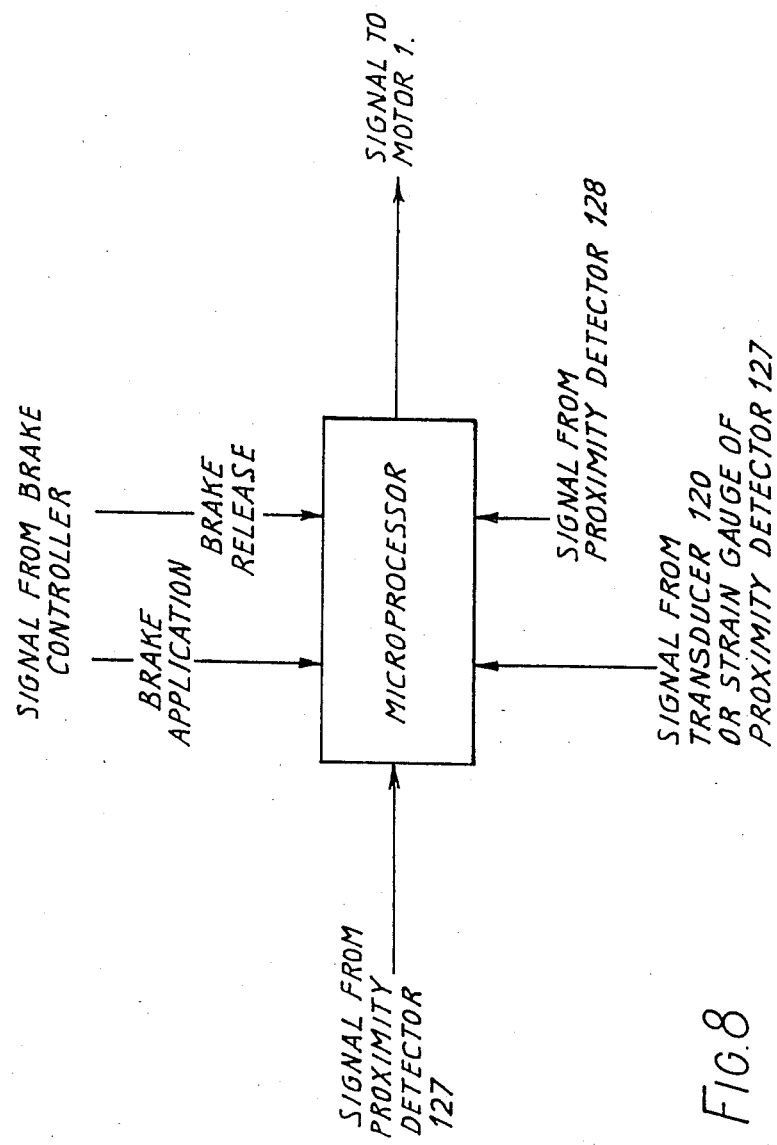

Embodiments of the present invention will now be described in greater detail, by way of example only, with reference to the accompanying drawings, of which:

FIG. 1 is a diagrammatic cross-sectional view of a first embodiment suitable for use with disc brakes, FIG. 2 is a diagrammatic representation of a second embodiment which is illustrated connected to disc brake equipment, and FIG. 3 shows a longitudinal cross-sectional view of a third embodiment, FIG. 4 shos a scrap transverse cross-sectional view on the line x—x of FIG. 3, FIG. 5 diagrammatically shows the arrangement of the switches and the cam for use in FIG. 3, FIG. 6 shows part of the electrical circuit for operating the actuator of FIG. 3, FIG. 7 shows a longitudinal cross-sectional view of a fourth embodiment, FIG. 8 shows, diagrammatically, the electrical circuit for controlling the actuator of FIG. 7.

The following embodiments of the invention will all be described in the context of railway brake actuators. It will, however, be understood that the conepts incorporated in the following described embodiment can equally well be used in brake actuators for other forms of vehicles. Indeed, they are applicable also to brake actuators for other forms of rotating machinery or, generally, to actuators for generating a force for other han baking usage.

Referring now to FIG. 1, the actuator includes a power spring 1 and a control spring 10. The power spring 1 is operative between the intermediate wall 2 of a housing (not shown in totality in FIG. 1) and the flange 4 of an output member 5. The control spring 10 is operative between the second flange 7 on the output member 5 and a nut 9 threadedly engaged with a reversible screw thread on a ball-screw shaft 11.

Carried by the flange 4 of the output member 5 is a brake pad 40 engageable with a brake disc 41.

At its end opposite from the nut 9, the ball-screw shaft 11 carries a slotted disc 42 the periphery of which provides the gearwheel 12 meshed with the pinion 13 arranged to be driven by the electric motor 14.

As thus far described, the actuator operates in the following manner: in the "brake released" condition as shown in FIG. 1, the control spring 10 is held fully compressed and overcomes the force exerted by the power spring 1 thus holding the brake pad 40 out of engagement with the brake disc 41. Operation of the electric motor 14 will "let out" the control spring 10 and, thereby, reduce the force which it exerts in opposition to the power spring 1. By variably operating the electric motor 14 to vary the detractive force exerted by the control spring 10, the residual force exerted by the power spring 1 on the output member 5 can be varied to produce the required braking force exerted by the brake pad 40 on the brake disc 41.

To lock the electric motor 14 in any desired position of its operation, is a pawl 45 operable under the control of a solenoid 46 to engage between the teeth of the pinion 13. The pawl 45 is loaded by a spring 47 normally to be out of engagement with the pinion 13, energisation of the solenoid 46 driving the pawl 45 into between the teeth of the pinion 13 against that spring loading.

Located adjacent the slotted disc 42 is a slotted Hall-effect switch 50 which measures the degree of rotation of the disc 42.

Carried by the output member 5 is a first microswitch 48 which lies in the path of the nut 9. A second microswitch 49 carried by the intermediate wall 2 lies in the path of the output member 5 in its direction of travel to release the brakes.

This FIG. 1 embodiment operates in the following manner:

The actuator is shown in FIG. 1 in its "brakes released" condition and in this condition the solenoid 46 will have been energised to engage the pawl 45 with the pinion 13 and thus hold the motor 14 and slotted disc 42 in a position in which the control spring 10 is held compressed sufficiently fully to overcome the power spring 1. Thus the output member 5 will have been retracted and the brake pad 40 held out of engagement from the brake disc 41.

From this "brakes released" condition, an electrical control signal is first generated to indicate the required degree of braking. The generation of this control signal will first de-energise the solenoid 46 so that the spring 47 will withdraw the pawl 45 from engagement with the pinion 13. The release of pinion 13 then frees, through the gearwheel 12, the slotted disc 42 and the shaft 11 for rotation. Freeing the shaft 11 for such rotation, allows the control spring 10 to expand driving the nut 9 to the left. At the same time, expansion of the control spring 10 reduces the force which it exerts in opposition to the power spring 1 thus allowing the spring 1 to expand driving the output member 5 to the left to bring the brake pad 40 into engagement with the brake disc 41.

When the brake pad 40 is engaged with the brake disc 41, the output member 5 is prevented from any further leftward movement and the power spring 1 from any further extension. However, the control spring 10 is not so inhibited and it will continue to expand. Shortly after the brake pad 40 engages the brake disc 41, the continuing expansion of the control spring 10 will carry the nut 9 to engage the microswitch 48. Operation of the microswitch 48 generates a signal to cause the slotted Hall-effect switch 50 to start measuring the rotation of the disc 42. Clearly, the rotation of the disc 42 is a measure of the axial movement of the nut 9 which is, itself, a measure of the expansion of the control spring 10. In so far as the expansion of the control spring 10 is indicative of the reduction of the force which it exerts in opposition to the power spring 1 and, therefore, an indication of the residual force exerted on the output member 5 by the power spring 1 and, consequently, the braking force being exerted by the brake pad 40 on the brake disc 41, the rotation of the disc 42 is an indirect measurement of the braking force being exerted. The output signal from the slotted Hall-effect switch 50 is therefore compared with the original electrical signal generated to indicate the required degree of braking. When this output signal indicates a degree of braking just short of that indicated as required by the original electrical circuit, the solenoid 46 is energised to prevent any further extension of the control spring 1. The control spring 1 will thus be brought to a halt at a point which will result in the required degree of braking. Should the solenoid 46 have been energised too early or too late so that the nut 14 "undershoots" or "overshoots", this will be seen by the switch 50 and the solenoid 46 and the motor 14 operated accordingly. When the switch 50 "reads" the rotation of the disc 42 as indicative of the braking force being that required, the solenoid 46 is energised to engage the pawl 45 with the pinion 13 and thus "lock-in" that required degree of braking.

Should a variation in the required degree of braking now be indicated by variation of the original electrical signal, the pawl 45 will again be released and the electric motor 14 energised, if appropriate, to vary the degree of braking to bring it into accord with the variation to the electrical signal.

To release the brakes, the electrical signal is suitably revised. Such revision will, again, first cause the pawl 45 to be released from engagement with the pinion 13 and, thereafter, the motor 14 energised. Energisation of the motor 14 will now, through the pinion 13 and the gearwheel 12, rotate the shaft 11 to "wind-back" the nut 9 and re-compress the control spring 10. Initial re-compression of the spring 10 will increase the force detracted by it from that exerted by the power spring 1, thus reducing the braking force being exerted between the brake pad 40 and the brake disc 41. When this braking force has been substantially wholly reduced, continued compression of the control spring 10 will pull the brake pad 40 away from the brake disc 41. Just prior to the brake pad 40 leaving the brake disc 41, the nut 9 will also leave the microswitch 48. Thereafter, the motor 14 is continued to be operated for a predetermined amount (again, measured by the slotted Hall-effect switch 50) to provide the required clearance between the brake pad 40 and the brake disc 41.

It will be observed, of course, that any electrical power failure will result in a full brake application as loss of power will result in the pawl 45 being retracted from the pinion 13 by the spring 47 with the motor 14 remaining de-energised. Hence, the control spring 11 can fully expand to allow the totality of the force exertable by the power spring 1 to be applied as a braking force to the output member 5.

It will have been noted that, so far in the description of the operation, no mention has been made of microswitch 49. Spring-applied brake actuators conventionally have a manual release facility. It will be seen that the microswitch 49 is positioned beyond the normal "brake release" condition of the actuator. After a manual release, the control spring 10 will need to be compressed beyond its normal fully compressed condition so that the power spring 1 is, equally, more than fully compressed. The function of the microswitch 49 is to detect when the two springs 1 and 10 have been sufficiently over-compressed as to permit re-setting of the manual release.

Referring to FIG. 2, there is here illustrated another form of actuator incorporated into railway disc brake equipment. Like reference numerals are used for like parts in the preceding embodiment.

The actuator again includes the power spring 1 and the control spring 10. The power spring 1 is operative between (in this case) the end wall 2 and the flange 4 of the output member 5. The control spring 10 is operative between (in this case) the flange 4 and the nut 9 which, in this embodiment, is extended into a disc-like form being slidable within the housing 3 but being held from rotation relative thereto by a key 61 which rides in a slot 62 in the interior wall of the housing 3. The nut 9 is threadedly engaged on the ball-screw shaft 11.

At its remote end from the nut 9, the shaft 11 has a socket 63 of square cross-section which receives the squared-end 64 of the output shaft 65 of the electric motor 14.

As so far described, the actuator of this embodiment operates exactly as those of the preceding embodiment in that:

in the "brake released" condition of the actuator as shown in FIG. 2, the control spring 10 is fully compressed so as to overcome the force exerted by the power spring 1 and thus ensuring that there is no residual output force applied to the output member 5, and to apply the brakes, the motor 14 is freed to rotate the de-energisation of the latch 68. This permits the control spring 10 to expand thus reducing the detractive force exerted by it and, consequently, allowing an increasing residual force to be exerted by the power spring 1 on the output member 5.

In this embodiment, the shaft 11 has integral with it a disc 66 which has a toothed-periphery 67 engageable by a solenoid-operated latch 68. This latch 68, in its de-energised state, frees the shaft 11 for rotation and, in its energised state, locks the shaft 11 against rotation. The latch 68 is, of course, de-energised when the motor 14 is operated to rotate the shaft 11.

It will be seen that the disc 66 is supported for rotation on thrust bearing 69.

At its end remote from the disc 66, the shaft 11 is provided with a splined extension 70 which engages a similarly-splined axial bore 71 in a member 72. The member 72 provides a re-entrant flange 73 between which and a flange 74 at the end of a tubular extension 75 of the nut 9 is a further thrust bearing 76. Thus, on the one hand, the member 72 can rotate with the shaft 11 and, on the other hand, it can move axially with the nut 9.

Positioned in the path of axial movement of the flange 73 of the member 72, is a collapsible stop 77 the end face 78 of which facing the flange 73 constitutes a clutch face.

The above-described construction provides for limiting the maximum output force which can be exerted by the actuator, particularly, although not only, in an "emergency application" of the brakes.

From the "brakes released" condition of the actuator as shown in FIG. 2 in which the motor 14 will be de-energised and the latch 68 energised to lock the shaft 11, "emergency application" is effected merely by de-energising the latch 68. Without the motor 14 energised, de-energisation of the latch 68 frees the shaft 11 to be rotated. As it was the locking of shaft 11 which previously held the control spring 10 fully compressed, releasing shaft 11 allows the control spring 10 to extend. Such extension of the control spring 10, as in a "service" brake application, allows the residual output force to be applied to the output member 5.

Extension of the control spring 10 will also drive the nut 9 to the left, the shaft 11 (now being freed to rotate by release of the latch 68) being thereby forced to rotate. Rotation of the shaft 11, similarly rotates member 72 through the splined connection of the shaft 11 with the member 72. However, movement of the nut 9 to the left will move the member 72 axially to the left in addition to its rotation imparted by the shaft 11, by the interconnection of the nut 9 with the member 72 through the tubular extension 75, the flange 74, the thrust bearing 76 and the flange 73 on the member 72. The flange 73 will thus be carried into engagement with the collapsible stop 77 the clutch face 78 of which, being engaged by the flange 73, will prevent further rotation of the member 72 and thus the shaft 11. Such prevention of any further rotation of the shaft 11, prevents further axial movement of the nut 9 and, therefore, any further extension of the control spring 10. Thus, by the positioning of the stop 77, the minimum force can be set which the control spring 10 is allowed to detract from the power spring 1. Hence, the maximum residual output force allowed to be exerted on the output member 5 is determined by the positioning of the stop 77.

It will be noticed that the driving of the shaft 11 by the nut 9 in this way, will exert an axial loading to the left on the shaft 11. Hence, the inclusion of the thrust race 69.

It will also be noticed that apart from effecting an "emergency application" by positive de-energisation of the solenoid latch 68, such an application will automatically be effected should there by an electrical power failure.

As shown in FIG. 2, the above described actuator is suitable for operation of a railway vehicle's disc brakes.

The output member 5 is arranged to operate a final output member 80. Between these two members may be inserted some form of manual-release means 81 by which the final output member 80 can be released independently of the actuator.

The final output member 80 is pivotally connected at 82 to a lever 83 itself pivotally connected at 84 to a tension bar 85. The tension bar 85 is, in turn, pivotally connected at 86 to one of a pair of calliper lever 87/88. The levers 87/88 carry the brake pads 89.

Clearly, any movement of and force exerted by the output member 5 is transmitted to the brake pads 89.

Micro-switches 48 and 49 are again, provided, they having the same functions as the similarly-referenced micro-switches in the embodiment of FIG. 1.

If a load-limited brake application is being made, whether as an "emergency application" or otherwise, this will be a particularly heavy brake application with likely consequential greater wear of the brake pad or block. Whilst a slack adjuster may be incorporated, this will not deal with the brake wear as it occurs during a particular brake application but will merely adjust for such wear which occurs during one application before the next is made.

It will be seen that, in the FIG. 2 embodiment, the collapsible stop 77 is carried by the flange 4 of the output member 5 and, therefore, the stop 77 moves with the output member 5. With this arrangement, assuming a load-limited brake application and wear of the brake during the application, as the brake wears, the power spring 1 will, again, extend to accommodate that wear. However, with this arrangement of FIG. 2, such extension of the power spring 1 will dis-engage the clutch face 78 from the member 72. Such dis-engagement will free the member 72 (and, therefore, the ball-screw shaft 11) for rotation. Such rotation will occur as the nut 9 is now freed for axial movement under the influence of the control spring 10. Thus, whilst the initial extension of the power spring 1 in accommodating the wear had tended to compress the control spring 10, such compession will not, in fact, occur because the control spring 10 is free to compensate for such tendency by further axially displacing the nut 9. Hence, the two springs 1 and 10 will remain balanced to generate a residual force exerted on the output member 5 which is determined by the load setting of the collapsible stop 77 irrespective of the position of the output member 5 as it moves with increasing wear of the brake.

Referring now to FIGS. 3 and 4, the actuator comprises an electric motor 101 which, through a worm 180, is arranged to rotate a worm-wheel 181. The worm-wheel 181 is secured to a nut 110 which is threadedly-engaged with a ball-scew tube 106 which is rotatably-supported in a pair of walls 182 and 183 upstanding from a base plate 184. Between the wall 182 and the nut 110 is a thrust bearing 184.

The ball-screw tube 6 has, at its left-hand end, a flange 114 between which and a cup-shaped output member 117 extends a spring 115.

As so far described, it will be appreciated that if the motor 101 is energised in one direction, the nut 110 will be rotated relative to the ball-screw tube 106 axially to move that tube 106 to the left. Rotation of the motor 101 in the opposite direction will, equally, axially move the tube 106 to the right. Leftward movement of the tube 106 will, through the spring 115, move the output member 117 to the left. Should the output member 117, at any point, be prevented from such leftward movement, then the spring 115 will be compressed by continued operation of the motor 101 and thus caused to generate a growing output force on the output member 117 with the continued operation of the motor 101. From such a condition in which the motor 101 has compressed the spring 115 to cause it to generate the output force, reverse operation of the motor 101 will, firstly, reduce the output force being generated and, thereafter, allow the output member 117 to be moved back to the right with the spring 115.

Carried on a boss 185 of the output member 117 is a final output member 126 between which and the end face of the boss 185, is a belleville washer 186. Mounted on the interior of the output member 117 is a transducer 187 the detecting rod 188 of which projects through the base 185 and the belleville washer 186. The transducer 187 is thus arranged to detect compression of the belleville washer 186.

If the actuator is, therefore, arranged so as to exert a force on some part (not shown) which is normally axially spaced from the final output member 126, it will be seen that, as the final output member 126 is moved to the left by suitable operation of the motor 101 to effect the movements above described, the combination of the belleville washer 186 and the transducer 187 will allow detection of when the final output member 126 engages the part concerned. Conversely, in the reverse movement, the combination of the belleville washer 186 and the transducer 187 will allow detection of when the final output member 126 is about to leave the part concerned.

The output member 117 has co-axially mounted on its face opposite to the boss 185, a switch carrier 186. This carrier 186 has arranged around its circumference a series of switches shown diagrammatically at 187 in FIG. 3 and, still diagrammatically, in a developed projection of the circumference of the carrier 186, in FIG. 5. The switches S1–S10 (FIG. 5) are equally spaced around the circumferential face of the carrier 186 and are arranged to be sequentially operated by a cam face 188 again shown in a developed projection in FIG. 5. The switches S1–S10 are each double switches of which one "makes/breaks" the lines D1–D10 and the other "makes/breaks" the lines E1–E10. The arrangement of the double switches of each of the switches S1–S10 is such that, for left-to-right movement of the cam 188, the E switch is "made" after the D switch is "broken" and, for right-to-left movement of the cam 188, the E switch is "broken" before the D switch is "made". Hence, in each direction of movement of the cam 188, there is a "dead" fraction of time during which both D and the E switch of each switch S1–S10 are "broken".

Returning now to FIG. 3, the cam surface 188 constitutes the end face of a cup-shaped cam 189 which is co-axially and non-rotationally secured by its "bottom" to one end of a shaft 190 threadedly engaged co-axially with the ball-screw tube 106. Adjacent its end remote from the cam 189, the shaft 190 has secured to it a pinion 191 which, as shown in FIG. 4, is meshed with an arcuate gear 192. The gear 192 is pivotted about an axis 193 and is oscillatable about the axis 193 by a rod 194 pivoted to the gear 192 at 195. Axial movement of the rod 194, therefore, rotates the gear 192 about its axis 193 and, thereby, rotates the pinion 191. Rotation of the pinion 191 similarly rotates the shaft 190 and, by virtue of its threaded engagement with the ball-screw tube 106, moves the cam 189 towards or away from (depending on the direction of movement of the rod 194) the switches S1–S10. The rod 194 is moved in accordance with the load of the vehicle and it will thus be seen that the switches S1–S10 are operated earlier or later equally in accordance with the load of the vehicle.

The electrical circuit for controlling the actuator above described is shown in FIG. 6 from which it can be seen that there is provided a brake controller 200 operated by handle 201. The controller 200 has (not shown) an internal switching arrangement by which, in dependence upon the position of the handle 201, three control wires 202, 203 and 204 can be energised in a selected combination. Energisation of the control wires 202–204, operates the solenoids of the corresponding relay B205–207 to operate their associated contacts C0–C7, B0–B7 and A0–A7. The relay contacts are fed from a supply over line 208. The relay contacts are in series with the switches D and E of the switches S1–S10, the switches D and E of each switch S1–S10 being in parallel one with the other. The output of all of the D switches are commoned to an output line 209 and the E switches to an output line 210. Energisation of the line 209 energises the motor 101 of the actuator to drive the ball-screw tube 106 to the left as viewed in FIG. 3 and energisation of the line 210 energises the motor 101 to drive the ball-screw tube 106 to the right.

The above described actuator operates in the following manner:

The actuator is for the operation of a railway vehicle brake and is shown in FIG. 3 in the "brakes released" condition. The final output member 26 would in context, be coupled to the brake blocks for operating them into engagement with and to exert braking force on, the vehicle wheel in a manner similar to that shown in FIG. 2.

BRAKE APPLICATION

To effect a brake application, the handle 201 of the brake controller is moved to a position corresponding to the degree of braking required.

Movement of the handle 201 away from its "brake released" position immediately energises the motor 101 of the actuator in a direction, through worm 180, wormwheel 181, and nut 110, to move the ball-screw tube 106 to the left as viewed in FIG. 3. Through spring 115, output member 117, belleville washer 186 and final output member 126, such movement will move the brake block into engagement with the vehicle wheel. Such engagement of the brake will arrest the movement of the final output member 126 and continued operation of the motor 101 will cause the belleville washer 186 to collapse. This collapse will be detected by the transducer 187 which will thereby be operated to direct the energisation of the motor 1 via the line 208 and the contacts of the relays 205–207.

By moving the handle 201 of the brake controller 200 to effect the required degree of braking, the relays 205–207 will have been selectively energised to operate the various contacts A, B and C. For simplicity of description, let it be assumed that the degree of braking required has been indicated by movement of the handle 201 to a position in which only relay 205 has been energised. This energisation will reverse the position of all of its contacts C0–C7. It will, therefore, be seen that the line 0 which was previously the only wholly "made" line (indicative of "brake release") will now be "broken" and the only wholly "made" line will become line 4 leading to the switches D4 and E4 of the switch S4. E4 is, however, already "broken" so that the only completed circuit is via switch D4 which is in the line for energisation of the motor 101 to apply the brake. Hence, the motor 101 continues to be operated compressing the spring 115 and causing it to exert an output force on the output member 17. This force will be transmitted through the collapsed belleville washer 180 to the final output member 126 to be transmitted to the brake block as a braking force against the wheel.

As the ball-screw tube 106 continues its movement to the left as it collapses the spring 115, it will carry with it the cam 189. The cam face 188 will sequentially operate the switches S1, S2 and S3 but without any effect on the energisation of the motor 101 for the motor is only being energised over the line 104. However, when the ball-screw tube 106 has sufficiently compressed the spring 115 to cause it to generate the degree of braking required, the cam face 188 will operate the switch S4. In particular, it will operate the switch D4 of this switch S4, which was previously "made", to "break" it. By the "breaking" of switch D4, the line 4 over which the motor 101 was previously energised, will now be "broken" so that energisation of the motor 101 is now terminated. There being the "dead" space between the D and E switches of each switch S1–10, the "breaking" of switch D4 terminating the operation of the motor 101 results in cessation of travel of the cam face 188 before E4 is "made". Because of the worm-and-worm-wheel drive 180/181 between the motor 101 and the nut 110, this drive will "lock" to hold in the required degree of braking.

It will be remembered that the cam 189 was initially positioned by the mechanism 190–195 in accordance with the load of the vehicle. Hence, the degree of braking effected by operation of the motor 101 will be achieved irrespective of the load of the vehicle, the braking force generated by the spring 115 being adjusted to account for that load.

If, now, a different degree of braking is required, this is achieved by moving the handle 101 of the brake controller 200, to a new position. Such movement will change the status of energisation of the relays 205–207 and, through this changed status, complete a different line through the relay contacts. As the cam face 188 has previously moved over the switches S1-S4, the switches D1-D4 will successively have been "broken" and the switches E1-E4 successively "made" whilst the switches D5-D7 will continue to be "made" and the switches E5-E7 continue to be "broken".

Hence, if an increase in the degree of braking is now required, the re-positioning of handle 201 will, say, have also energised relay 206. This will cause the only wholly "made" line to be line 6. Thus, the motor 101 will be re-energised in the same direction as before to increase the braking effect until the cam face 188 has been moved to operate switch S6 and, thereby, operate its switch D6 to "break" the line 6 through which the motor 101 is now being energised.

Conversely, if a reduction in the degree of braking was required, the re-positioning of the handle 201 would, say, have additionally energised relay 207. The result of this would have been that only line 1 was now wholly "made".

It will be remembered that, in reaching switch S6, the cam 188 had previously operated switch S1 to "break" its switch D1 and make its switch E1. Hence the motor 101 will now be energised only over line 110. Such energisation will cause the motor 101 to be operation in its reverse direction to move the ball-screw tube 106 to the right (as viewed in FIG. 3). This movement will reduce the degree of compression of the spring 115 and, therefore, the degree of braking force which it causes to be exerted.

BRAKES RELEASE

To release the brake, the handle 201 of the brake controller 100, is moved back to its "brake released" position. This will de-energise all of the relays 205–207 so that the only wholly "made" line is line 0. As the cam 188 has previously "broken" switch D1 and "made" switch E1, the motor 101 is now energised over line 110 to operate it in a direction to move the ball-screw tube 106 to the right thus progressively permitting the spring 115 to recover.

When the spring 115 has fully recovered so that it is no longer exerting any output force on the output member 117, the belleville washer 186 will recover. The final output member 126, the output member 117 and the spring 115 will now all be returned to their initial position by the normal return spring in the brake rigging of the brake block.

SLACK ADJUSTMENT

As observed above, as the brake block is about to leave the wheel, by the braking force having reduced to zero, the belleville washer 186 will recover. This will be "seen" by the transducer 187.

To ensure the normal required clearance between the brake block and the wheel, the electrical circuit controlling the motor 101 may be such that re-operation of the transducer 187 causes continued operation of the motor 101 to a pre-determined extent after operation of the transducer 187 so that, under the influence of the conventional rigging return spring, the brake block is allowed to move away from the wheel a pre-determined distance before the motor 101 ceases operation and the system is "locked" by the worm-and-worm-wheel connection 180/181.

Alternatively, the motor 101 may have a fly-wheel to which it is connected in a "brake release" operation, the motor 101 then being de-energised as soon as the transducer 187 "sees" the recovery of the belleville washer 186 and the fly-wheel continuing rotation of the nut 110 to a pre-determined degree even after de-energisation of the motor 101.

Referring now to FIG. 7, the embodiment here shown is generally of similar construction to that of FIG. 3 and, again, like references are used for like parts. The similarity of these two embodiments is such that no further description is here needed of the like parts.

In this embodiment, the motor 101 may conveniently be a stepper motor operable to rotate the nut 110 in discrete steps thus effecting compression of the spring 115 equally in steps so that it is caused to generate on the output member 117 an output force which also increases in steps.

To measure the value of the output force being generated, there is arranged in parallel with the spring 115 a transducer 220 which generates a signal indicative of the degree of compression of the spring 115. In an alternative, the transducer 187 may not merely be responsive only to the compression and recovery of the belleville washer 186 for the purpose described above with reference to the embodiment of FIG. 3, it may additionally incorporate a strain gauge by which the strain experienced by the final output member 126 in the transmission of the output force is measured. With such arrangements, either of the transducers 220 or 187 will give signals indicative of the value of the output force being generated on the output member 117 by the spring 115.

In this embodiment, the axial position of the shaft 110 is adjusted in accordance with the load of the vehicle by a second stepper motor 221 which, through a worm 222, is arranged to drive a worm-wheel 223. The worm-wheel 223 is threaded in its axial bore 224 and is thereby, threadedly-engaged with a screw-threaded portion 225 on the shaft 190.

At its end remote from the portion 225, the shaft 190 is provided with a flange 226 which carries a proximity-detector 227.

Unlike the embodiment of FIG. 3, the above-described arrangement does not permit of variable-load control of the braking force exerted throughout its range, but merely serves as a load-limiting arrangement to ensure that the braking does not exceed that which is acceptable for the load of the vehicle. To achieve this load-limited braking characteristic, the second stepper motor 221 is, prior to a brake application, operated to an extent consistent with the load of the vehicle. This will axially position the flange 226 (and, therefore, the proximity-detector 227) to a position indicative of the load of the vehicle. If, now, a brake application is made by the energisation of the motor 101, the ball-screw tube 106 will axially be moved to the left to compress the spring 115 and thus cause it to exert a braking force in the manner above described with reference to FIG. 3. Should a braking force be demanded which is higher than that permissible with the particular load of the vehicle, before that demanded degree of braking is achieved, the flange 114 of the ball-screw tube 106 will engage the stem of the proximity detector 227 so actuating it and immediately terminating any further increase in the braking force by de-energising the motor 101 and terminating further compression of the spring 115.

A further proximity detector 228 is provided which, by engagement of its stem 229 by the rear face of the flange 114 on the ball-screw tube 106, can detect when the ball-screw tube 106 is fully retracted. This detector 228 may be employed when it is required fully to retract the brake block to replace it, the motor 101 then being energised to operate it in the "brake released" direction beyond any normal clearance of the brake block with the wheel until the detector 228 is operated.

The above described actuator is controlled by electrical circuitry incorporating a microprocessor as illustrated in FIG. 8. From a suitable brake controller (such as that shown in FIG. 6), the microprocessor can be fed with either a "brake application" signal or a "brake release" signal, the "brake application" signal being suitably modified to indicate the degree of braking required to be exerted. A signal from the transducer 220 or the strain gauge of the proximity detector 227, is also fed to the microprocessor which constantly monitors this signal and compares it to the "brake application" signal. Upon receiving a "brake application" signal, the microprocessor generates a signal to the motor 101 causing it to be energised in a direction to apply the brakes. As the braking force generated by the spring 115 on the output member 117 inreases by continued operation of the motor 101 compressing the spring 115, the signal from the transducer 220 or the detector 227 will continuously vary accordingly. When this varying feed-back signal is found by the microprocessor to equate with the degree of braking demanded by the "brake application" signal, the output signal to the motor 101 will be terminated. Hence, operation of the motor 101 ceases, and the desired degree of braking is "locked-in" by the worm-and-worm-wheel drive 180/181. Should, prior to such equation, the proximity switch 227 be operated (indicating that the demanded degree of braking exceeded that permissible for the load of the vehicle), the microprocessor will immediately terminate further operation of the motor 101.

In a "brake release" operation, the brake controller will feed a "brake release" signal to the microprocessor. This will cause an output signal to the motor 101 to operate it in the reverse direction to move the ball-screw tube 106 to the right (as viewed in FIG. 7). Such movement of the tube 106 will allow the spring 115 to recover thus reducing, eventually to zero, the braking force previously exerted on the output member 117 by the spring 115. When the braking force is, in fact, reduced to zero, this is indicative that the brake block is about to leave the wheel. At this point, the belleville washer 186 will recover and the proximity detector 187 will be operated so to indicate. The microprocessor will then receive a signal from the detector 117.

Upon receipt of the signal, the microprocessor will allow continued operation of the motor 101 to a pre-determined extent; that extent being pre-determined to give a nomal clearance between the brake block and the wheel.

Instead of the microprocessor being programmed for this "over-run" of the motor 101 to effect the normal clearance, the flywheel arrangement described above with reference to the FIG. 3 embodiment may be used.

We claim:

1. An electric actuator having an output member movable from a first variable position to a second variable position; a spring means for exerting a variable output force on said output member for transmission thereby, when said output member is in the second position thereof; an electric motor means for controlling said spring means to control the variable output force exerted on the output member when the output member is in second position thereof; means for generating an electrical signal when the output member is about to leave the second position for return thereof to the first position; and motor-control electrical circuit means, responsive to the generation of the electrical signal, for controlling the operation of the electric motor so as to cause the output member to move a predetermined distance back to the first position which maintains a substantially constant spacing between the first and second positions.

2. An actuator as claimed in claim 1, wherein the output member comprises two parts and an element located between said two parts and collapsible to a collapsed state responsive to the transmission of the output force between the two parts, said signal generating means being responsive to the recovery of the element from a collapsed state upon removal of the output force from the output member to generate the electrical signal.

3. An actuator as claimed in claim 1, wherein the spring means is comprised solely by a power spring, and the electric motor means being operable to vary the length of the power spring thus to cause the power spring to exert the output force.

4. An actuator as claimed in claim 1, wherein said spring means comprises a power spring arranged to exert a force on the output member and a force-applying control spring arranged with respect to the power spring such that the force exerted by the control spring is subtracted from the force exerted by the power spring to determine the residual force exerted on the output member by the power spring, said residual force constituting the output force, and the electric motor being arranged to vary the subtractive force exerted by the control spring.

5. An actuator as claimed in claim 4, wherein the signal generating means is responsive to recovery of the control spring to a condition in which the control spring exerts the maximum subtractive force.

6. An actuator as claimed in claim 1, further comprising two threadedly-engaged relatively rotatable parts for controlling said spring means, said electric motor means comprising a rotary motor for controlling the spring means by providing relative rotation of said two threadedly-engaged parts, and said signal generating means comprising means for measuring the degree of rotation of the rotary motor.

7. An actuator as claimed in claim 6, wherein the signal generating means comprises a Hall-effect switch.

8. An actuator as claimed in claim 1, wherein the signal generating means comprises a free-wheel means for permitting the electric motor means to free-wheel a predetermined amount under the influence of a spring arrangement for moving the output member away from the second position thereof, after the generation of the electric signal.

* * * * *